US012577513B2

(12) United States Patent
Yao

(10) Patent No.: US 12,577,513 B2
(45) Date of Patent: Mar. 17, 2026

(54) METHODS FOR AGING ALCOHOL PRODUCTS USING INTELLIGENT ULTRASONIC TECHNOLOGY

(71) Applicant: Shenzhen Codyson Electrical Co., Ltd., Guangdong (CN)

(72) Inventor: Xingyuan Yao, Guangdong (CN)

(73) Assignee: Shenzhen Codyson Electrical Co., Ltd., Shenzhen (CN)

( * ) Notice: Subject to any disclaimer, the term of this patent is extended or adjusted under 35 U.S.C. 154(b) by 1084 days.

(21) Appl. No.: 17/588,294

(22) Filed: Jan. 30, 2022

(65) Prior Publication Data

US 2022/0154116 A1    May 19, 2022

Related U.S. Application Data

(63) Continuation of application No. PCT/CN2020/086283, filed on Apr. 23, 2020.

(30) Foreign Application Priority Data

Sep. 3, 2019    (CN) .......................... 201910827182.2

(51) Int. Cl.
*C12H 1/16*         (2006.01)
(52) U.S. Cl.
CPC ..................................... *C12H 1/16* (2013.01)
(58) Field of Classification Search
CPC .................................. C12H 1/16; C12H 1/165
See application file for complete search history.

(56) References Cited

FOREIGN PATENT DOCUMENTS

| CN | 205329000 U | 6/2016 |
| CN | 206814734 U | 12/2017 |
| CN | 108277140 A | 7/2018 |
| CN | 208395142 U | 1/2019 |

OTHER PUBLICATIONS

International search report of PCT Patent Application No. PCT/CN2020/086283 issued on Jul. 23, 2020.

*Primary Examiner* — Vera Stulii

(57)         ABSTRACT

Disclosed is a method for aging an alcohol product by using intelligent ultrasonic technology. A sealed stainless-steel aging cylinder is arranged on a bracket in advance, and the bracket is arranged above a stainless-steel tank provided with an ultrasonic generator at the bottom, so that indirect ultrasonic aging is performed on a new alcohol product in the stainless-steel aging cylinder. Firstly, a water-injecting sub-process is initiated; an alcohol product-feeding sub-process is initiated and a specific aging sub-process is initiated; a temperature control sub-process is synchronously performed during the aging process; and an alcohol product-discharging sub-process is initiated. After the alcohol product-discharging sub-process, determining whether the alcohol product is required to replace can be added. If yes, a gas-washing sub-process is initiated, and if not, the alcohol product-feeding sub-process is directly performed to continue aging. Such a cycle is repeated to automatically perform the alcohol product-aging process.

10 Claims, 4 Drawing Sheets

METHODS FOR AGING ALCOHOL PRODUCTS USING INTELLIGENT ULTRASONIC TECHNOLOGY

CROSS REFERENCE TO RELATED APPLICATIONS

The present application is a Continuation Application of PCT Application No. PCT/CN2020/086283 filed on Apr. 23, 2020, which claims the benefit of Chinese Patent Application No. 201910827182.2 filed on Sep. 3, 2019. All the above are hereby incorporated by reference in their entirety.

FIELD

The present invention relates to an equipment for aging an alcohol product, and in particular, to a method for aging an alcohol product by using intelligent ultrasonic technology.

BACKGROUND

With the discovery that ultrasonic technology plays an important role in the aging of an alcohol product, the ultrasonic technology is also gradually applied in the extended application field of aging alcohol products. Since the alcohol product itself has the problems of volatilization and quality change after heating, it is necessary to control a temperature of aging process within a certain temperature range.

In the existing devices for aging the alcohol product using ultrasonic technology, there are a small amount of aging devices which are suitable for small-scale aging applications for bottled alcohol products in a small bottle, and there are some aging devices which are suitable for large-scale aging applications. For production enterprises of alcohol product, an amount of alcohol product to be aged is extremely large, so the aging devices for ordinary small bottles are not obviously suitable for large-scale industrial production applications. The existing applications and large-scale industrial aging methods generally all involve aging by direct contact with an ultrasonic, i.e., directly inserting a generator into a large alcohol product container to perform ultrasonic aging on the alcohol product in the alcohol product container. Since the alcohol product is in a large amount, it is necessary to use a high-power generator or a plurality of generators in series, which may bring the following problems: 1) when aging has been performed in a non-sealed state, alcohol and other ingredients volatilize during the aging process, which greatly affects the quality of the alcohol product; 2) the aging degree is not uniform, and especially the aging degree of the alcohol product in a position near the ultrasonic generator is much higher than that of the alcohol product in a far position, which may cause that, for example, a part of the alcohol product excessively aged, while another part of the alcohol product does not meet aging requirement. Based on the above reasons, aging an alcohol product using ultrasonic technology has not been widely applied in production enterprises of alcohol products. Moreover, the operation process requires a lot of labor, resulting into low efficiency and uniform quality. Therefore, in the industry, there are lack of an automated production process for aging an alcohol product which is suitable for large-scare production, and an automated aging equipment for supporting said process

SUMMARY

In view of the above defects, a purpose of the present disclosure lies in how to realize automated aging of a new alcohol product in a large batch using ultrasonic technology.

In order to solve the above problems, the present disclosure provides a method for aging an alcohol product by using intelligent ultrasonic technology, a sealed stainless-steel aging cylinder is arranged in advance on a bracket that is arranged above a stainless-steel tank provided with an ultrasonic generator at the bottom so as to realize indirect aging of a new alcohol product in the stainless-steel aging cylinder by using ultrasonic technology, wherein the specific aging processes comprise:

a water-injecting sub-process: controlling to inject water into the stainless-steel tank to a preset liquid level by controlling an electric control valve;

an alcohol product-feeding sub-process: controlling to inject the new alcohol product to be aged into the stainless-steel aging cylinder from a new alcohol product vat to a preset liquid level by controlling an electric control valve for feeding the alcohol product;

an alcohol product-aging sub-process: controlling an ultrasonic drive circuit to age the new alcohol product in the stainless-steel aging cylinder according to a preset aging process;

a temperature control sub-process: continuously monitoring a temperature of water in the stainless-steel tank in a process of aging the new alcohol product, and controlling water in the stainless-steel tank through a cooling equipment within a preset temperature range; and an alcohol product-discharging sub-process: after the aging of the new alcohol product has been completed, discharging an aged alcohol product to an aged alcohol product vat through an electric control valve for discharging the alcohol product, and then re-performing the alcohol product-feeding sub-process to draw the new alcohol product from the new alcohol product vat for performing a new round of aging of a new alcohol product.

The method for aging an alcohol product by using intelligent ultrasonic technology is characterized in that the method further comprises a gas-washing sub-process of injecting a high-pressure gas with a set pressure intensity into an alcohol product pipeline to instantaneously atomize a residual alcohol product in the alcohol product pipeline by instantaneously releasing and discharge from the alcohol product pipeline with the high-pressure gas.

The method for aging an alcohol product by using intelligent ultrasonic technology is characterized in that the gas-washing sub-process comprises the following specific steps:

step 3.1, closing an exhaust valve, a main alcohol product-feeding valve, an alcohol product discharge valve, and an electric control sub-inlet valve;

step 3.2, opening a waste alcohol product-discharging valve between an alcohol product-discharging pipe and a water discharge pipe;

step 3.3, connecting a high-pressure gas pump to a high-pressure gas input port to be washed; injecting the high-pressure gas into the stainless-steel aging cylinder arranged on the same layer through the high-pressure gas pump, and when a pressure of the high-pressure gas in the stainless-steel aging cylinder is detected to reach a preset range, stopping injection of the high-pressure gas and closing a gas intake valve;

step 3.4, opening the electric control sub-inlet valves on the same layer at the same time to expand and vaporize the residual alcohol product in the stainless-steel aging cylinder and the alcohol product pipeline and discharge with the high-pressure gas through the alcohol product pipeline, wherein a part of the alcohol product is liquefied at the outlet due to sharp drop in the pressure intensity and discharged through a water discharge pipe to complete the gas-washing of the stainless-steel aging cylinder on the layer; and step 3.5 closing all of the electric control sub-inlet valves when the gas-washing has been completed, and executing the step 3.3 until the washing of the stainless-steel aging cylinders on all of the layers has been completed.

The method for aging an alcohol product by using intelligent ultrasonic technology is characterized in that each of the stainless-steel aging cylinder is provided with only one alcohol product outlet-inlet pipe which extends into the bottom of the stainless-steel aging cylinder and is slightly higher than the bottom of the stainless-steel aging cylinder, wherein feeding the alcohol product and discharging the alcohol product are performed through the same alcohol product outlet-inlet pipe; and wherein the alcohol product-feeding sub-process specifically comprises firstly closing the electric control valve for discharging the alcohol product on an alcohol product-discharging pipeline, opening the main alcohol product-feeding valve, controlling to open the corresponding electric control sub-inlet valve to the stainless-steel aging cylinder to be injected and initiating an alcohol product-feeding pump to inject the new alcohol product to be aged into the stainless-steel aging cylinder, and closing the corresponding electric control sub-inlet valve to the stainless-steel aging cylinder when a liquid level of the alcohol product reaches or exceeds a preset range by monitoring the liquid level in the stainless-steel aging cylinder during the process.

The method for aging an alcohol product by using intelligent ultrasonic technology is characterized in that the alcohol product-discharging sub-process specifically comprises: closing the main alcohol product-feeding valve, keeping the alcohol product-discharging valve closing, opening the corresponding electric control sub-inlet valve to each of the stainless-steel aging cylinder and at the same time opening a bypass valve on a bypass pipe between the alcohol product-discharging pipe and the alcohol product-feeding pipe, initiating an alcohol product-discharging pump, controlling to re-inject the alcohol product processed within a preset time period back to the new alcohol product vat, when the preset time period is expired, controlling to open the alcohol product-discharging valve and at the same time closing the bypass valve, controlling to discharge the aged alcohol product into an aged alcohol product vat until all of the alcohol products have been discharged, and closing the alcohol product-discharging pump and the alcohol product-discharging valve.

The method for aging an alcohol product by using intelligent ultrasonic technology is characterized in that an exhaust hole is further provided on an upper cover of each of the stainless-steel aging cylinder, the exhaust hole being connected to an exhaust pipe provided with an exhaust valve and a filter at an outlet, wherein the exhaust valve is controlled to open when the alcohol product-discharging sub-process is initiated and when the alcohol product-feeding sub-process is initiated, and after the alcohol product-discharging sub-process and the alcohol product-feeding sub-process are performed, the exhaust valve is controlled to close immediately, realizing sealing of the stainless-steel aging cylinder during the aging of the alcohol product.

The method for aging an alcohol product by using intelligent ultrasonic technology is characterized in that the method further comprises a new alcohol product washing sub-process, comprising the steps of initiating the alcohol product-feeding sub-process firstly; after the alcohol product-feeding sub-process has been performed, opening the exhaust valve, closing the main alcohol product-feeding valve and the alcohol product-discharging valve and at the same time opening the bypass valve on the bypass pipe between the alcohol product-discharging pipe and the alcohol product-feeding pipe; and initiating the alcohol product-discharging pump to discharge the alcohol product in all of the stainless-steel aging cylinders back to the new alcohol product vat through the bypass pipe.

The method for aging an alcohol product by using intelligent ultrasonic technology is characterized in that the method further comprises a temperature control sub-process, specifically comprising the steps of additionally arranging a water cooler with a water outlet connected to a water inlet of the stainless-steel tank and a water inlet connected to a water outlet of the stainless-steel tank, and a circulating water pump on a pipeline; during the aging sub-process, monitoring a temperature of water in the stainless-steel tank through a temperature sensor, when the temperature is monitored to exceed a preset threshold, initiating the circulating water pump and the water cooler to cool water in the stainless-steel tank through the water cooler to control the temperature within the preset range.

The method for aging an alcohol product by using intelligent ultrasonic technology is characterized in that more than two stainless-steel aging cylinders are arranged at the same height, and each of the stainless-steel aging cylinders is correspondingly provided with a separate ultrasonic drive unit and the stainless-steel tank; the water inlets of the stainless-steel tanks on the same layer are connected and connected to the water inlet pipe; the water outlets of the stainless-steel tanks on the same layer are connected together and connected to the water discharge pipe; the stainless-steel tanks on the same layer are provided with only one liquid level sensor; when an water injection operation is initiated, a water discharge valve is closed and a water inlet switch is controlled to open to inject water into the stainless-steel tank; after a period of injection, the water inlet switch is closed; after a period of delayed waiting, it is determined whether a current height of the liquid level has reached a preset height; if not, the water inlet switch is opened again to continually inject the water into the stainless-steel tank; after a period of the injection, the water inlet switch is closed again; after a period of delayed waiting, it is determined again whether a current height of the liquid level has reached a preset height; and the operation is repeated until the preset height of the liquid level is reached.

The method for aging an alcohol product by using intelligent ultrasonic technology is characterized in that the method further comprises a water-replenishing sub-process and a water-replacing sub-process, wherein the water-replenishing sub-process comprises regularly monitoring the liquid level of the stainless-steel tank, when the liquid level of the stainless-steel tank is detected to be below the preset threshold, injecting water into the stainless-steel tank to reach the preset height by controlling the water inlet valve; and wherein the water-replacing sub-process specifically comprises recording a current duration of water use in the stainless-steel tank by arranging a timer or a counter, when the preset duration threshold is reached, performing the water-replacing sub-process after the last alcohol product-discharging sub-process has been completed, closing the water feed valve, opening the water discharge valve, discharging water in the stainless-steel tank and the water pipeline, and re-performing the water-injecting sub-process.

The present disclosure provides a method that can be applied to the indirect batch aging of a new alcohol product using ultrasonic technology. The temperature and the sealing are strictly controlled during the aging process, effectively guaranteeing consistency of aging effect and quality. The entire processes of feeding the alcohol product, discharging the alcohol product, the temperature control, replacing the alcohol product and the like are automatically realized by means of state checks in combination with sensors and by controlling the corresponding valves, enabling to realize automatic batch production. The method can be widely applied in alcohol product factories and alcohol product packaging manufacturers to shorten the cycle of new alcohol product's appearing on the market and greatly improve the quality of the new alcohol product, and has a wide range of application scenarios.

DETAILED DESCRIPTION OF THE EMBODIMENTS

Figure 1:
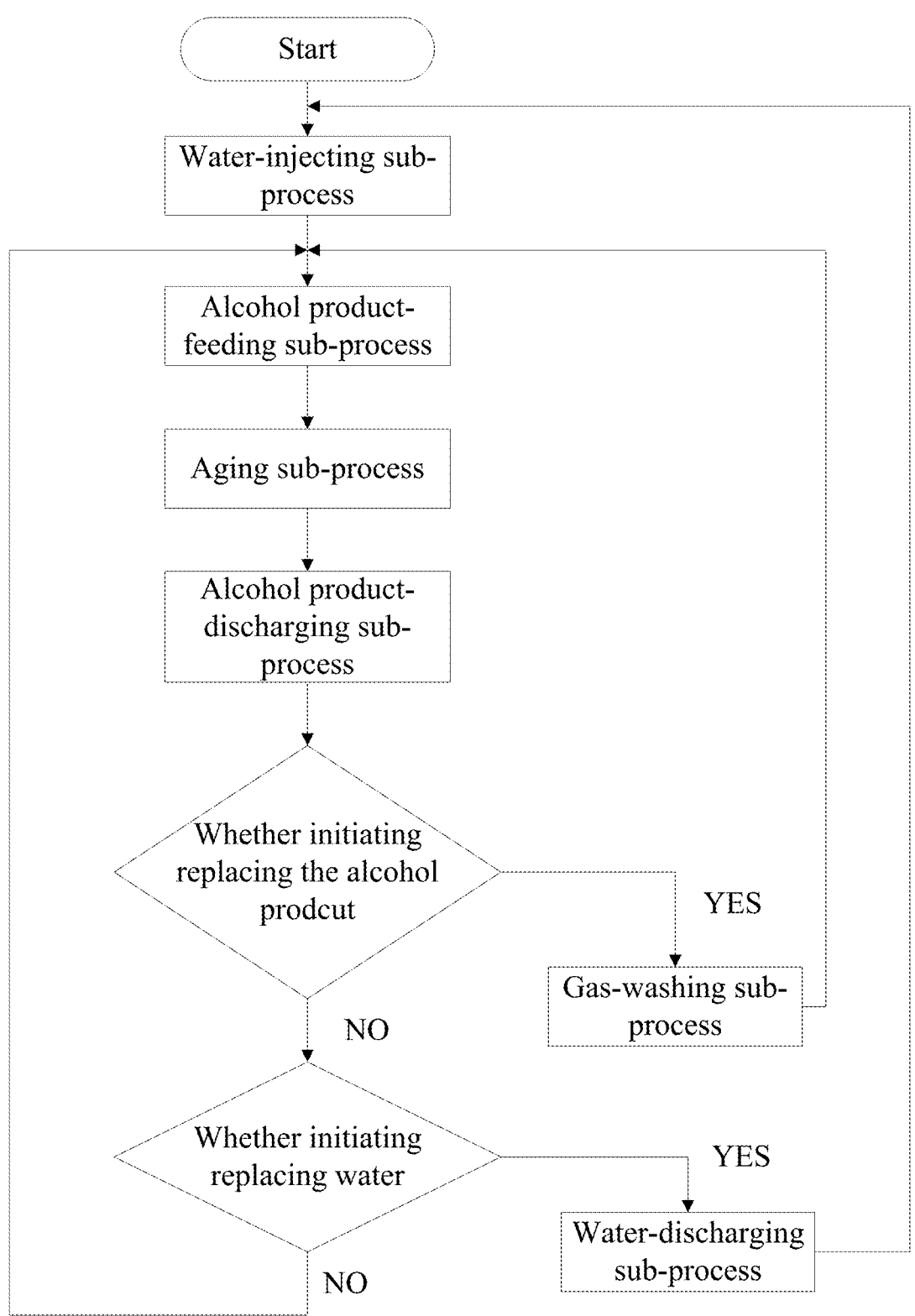
FIG. 1 illustrates a general flow chart of a method for aging an alcohol product by using intelligent ultrasonic technology.

The technical solutions in the examples of the present disclosure will be clearly and completely described below with reference to the accompanying drawings in the examples of the present disclosure. Obviously, the described examples are only a part of the examples of the present disclosure, but not all of the examples. Based on the examples of the present disclosure, all other examples obtained by a person of ordinary skill in the art without creative efforts shall fall within the protection scope of the present disclosure.

Provided is a method suitable for realizing aging of a new alcohol product in a large batch using ultrasonic technology, and realizing automation of the entire process to automatically and continuously aging the alcohol product. The aging of the alcohol product in the stainless-steel cylinder body realized by an indirect mode. Specifically, a new alcohol product to be aged was put into a stainless-steel aging cylinder, and the cylinder was arranged on a bracket and the bracket was suspended on a stainless-steel tank into which water was added to a certain liquid level, and a generator was provided at the bottom of the stainless-steel tank, and the generator was driven by a drive circuit to generate ultrasonic waves, which were transmitted to the water in the stainless-steel tank through the stainless-steel tank and were transmitted into the stainless-steel aging cylinder through the water to age the alcohol product in the stainless-steel aging cylinder using the ultrasonic waves, which is a mode of indirect aging through water instead of directly performing the ultrasonic aging by directly placing the generator into the alcohol product. In order for entire uniformity of the ultrasonic waves, three separate generators are arranged on each of the stainless-steel tanks at the bottom to enable ultrasonic intensity more uniform. During the alcohol product-aging process, heat will be generated, which may cause an increase in temperature of the alcohol product. Different alcohol products can withstand different degrees of increase in temperature. By the increase in temperature the alcohol or other beneficial ingredients were easily volatilized thereby affecting the quality of the final aged alcohol product. Therefore, it is necessary to strictly control the temperature during the aging process. Thus, the water pipeline is added with a cooling water heat exchanger, through which the temperature was controlled within a preset range, thereby realizing the aging of the alcohol product. Accordingly, it is very critical for the overall function of the system that the control of the water pipeline and the temperature control were realized. Since the alcohol product is a food product that can be eaten directly, all of the pipelines through which the alcohol product passes are made of food-grade stainless-steel materials that comply with food safety regulations. While, the water pipeline is made from parts or materials that can meet the performance requirements and life requirements. Due to the relatively large amount of data involved in sensors and control valves, PLC is introduced to realize the control.

Provided is a method for aging an alcohol product by using intelligent ultrasonic technology, and the specific aging processes mainly include:

a water-injecting sub-process: controlling to inject water into the stainless-steel tank to a preset liquid level by controlling an electric control valve;

an alcohol product-feeding sub-process: controlling to inject the new alcohol product to be aged into the stainless-steel aging cylinder from a new alcohol product vat to a preset liquid level by controlling an electric control valve for feeding the alcohol product;

an alcohol product-aging sub-process: controlling an ultrasonic drive circuit to age the new alcohol product in the stainless-steel aging cylinder according to a preset aging process;

a temperature control sub-process: continuously monitoring a temperature of water in the stainless-steel tank in a process of aging the new alcohol product, and controlling water in the stainless-steel tank through a cooling equipment within a preset temperature range; and an alcohol product-discharging sub-process: after the aging of the new alcohol product has been completed, discharging an aged alcohol product to an aged alcohol product vat through an electric control valve for discharging the alcohol product, and then re-performing the alcohol product-feeding sub-process to draw the new alcohol product from the new alcohol product vat for performing a new round of aging of a new alcohol product a gas-washing sub-process: injecting a high-pressure gas with a set pressure intensity into an alcohol product pipeline to instantaneously atomize a residual alcohol product in the alcohol product pipeline by instantaneously releasing and discharge from the alcohol product pipeline with the high-pressure gas.

FIG. 1 illustrates a general flow chart of a method for aging an alcohol product by using intelligent ultrasonic technology. After confirm that all pipelines of each system have been connected, the system started to work. Firstly, the water-injecting sub-process was initiated. After the water injection was completed, the alcohol product-feeding sub-process was initiated. After the alcohol product-feeding sub-process was completed, the specific aging sub-process was initiated. During the aging process, the temperature control sub-process is performed synchronously. After the aging was completed, the alcohol product-discharging sub-process was initiated. After the alcohol product-discharging sub-process was completed, it was additionally determined whether there was a requirement to replace the alcohol product. If yes, the gas-washing sub-process is initiated. If not, it is determined whether the water needs to be replaced. If yes, the water discharge sub-process is initiated for performing the discharge and after the water discharge was completed, the water-injecting sub-process was re-initiated. If no, the alcohol product-feeding sub-process was directly performed to continue aging. Such a cycle is repeated to automatically perform the alcohol product-aging process, thereby realizing the automated production. Various specific processes will further be described in details as below in combination with specific equipment.

Figure 2:
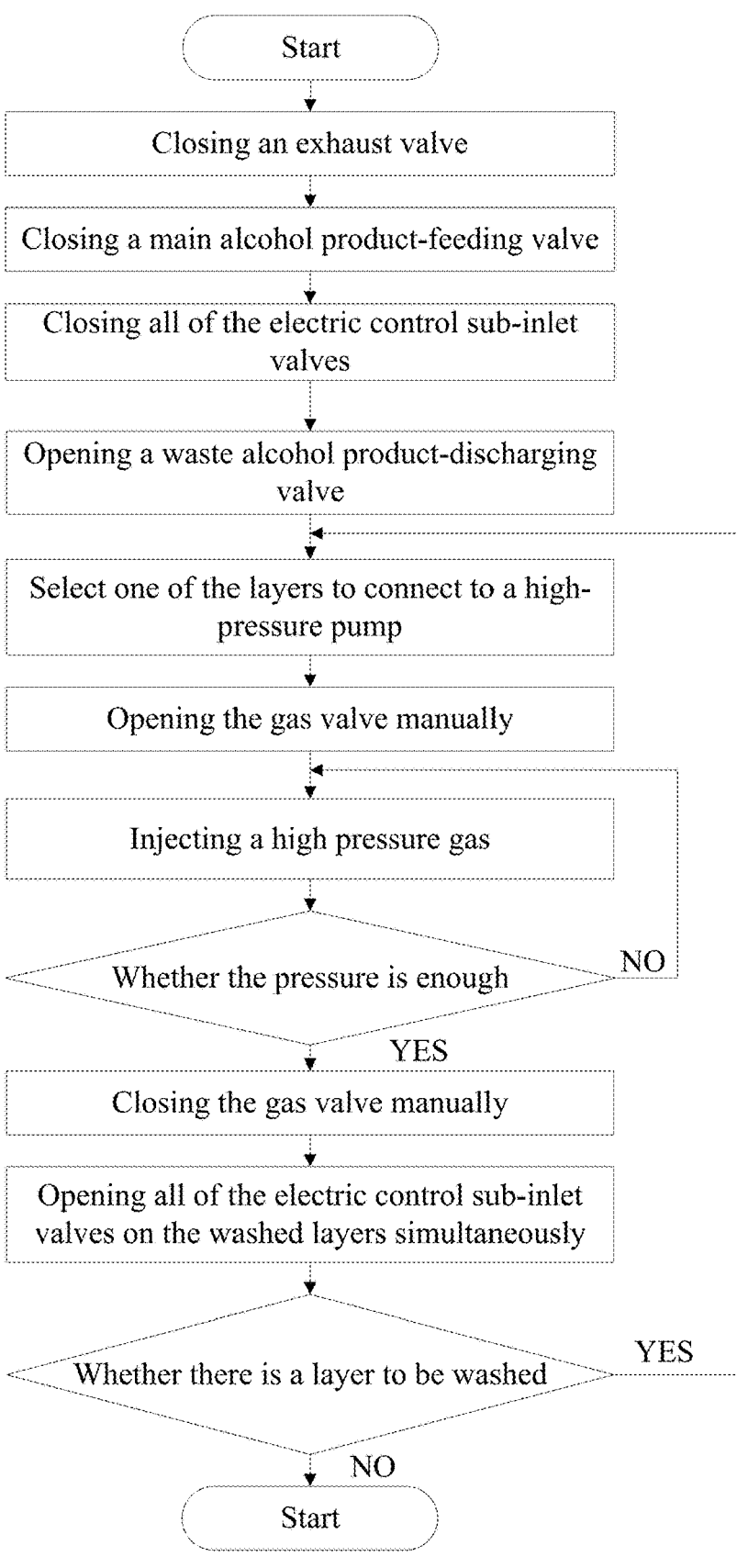
FIG. 2 illustrates a gas-washing flow chart.

FIG. 2 is a gas-washing flow chart. The specific steps were as follows.

Step 3.1, closing an exhaust valve, a main alcohol product-feeding valve, an alcohol product discharge valve, and an electric control sub-inlet valve;

Step 3.2, opening a waste alcohol product-discharging valve between an alcohol product-discharging pipe and a water discharge pipe;

Step 3.3, connecting a high-pressure gas pump to a high-pressure gas input port to be washed; injecting the high-pressure gas into the stainless-steel aging cylinder arranged on the same layer through the high-pressure gas pump, and when a pressure of the high-pressure gas in the stainless-steel aging cylinder is detected to reach a preset range, stopping injection of the high-pressure gas and closing a gas intake valve;

Step 3.4, opening the electric control sub-inlet valves on the same layer at the same time to expand and vaporize the residual alcohol product in the stainless-steel aging cylinder and the alcohol product pipeline and discharge with the high-pressure gas through the alcohol product pipeline, wherein a part of the alcohol product is liquefied at the outlet due to sharp drop in the pressure intensity and discharged through a water discharge pipe to complete the gas-washing of the stainless-steel aging cylinder on the layer; and Step 3.5 closing all of the electric control sub-inlet valves when the gas-washing has been completed, and executing the step 3.3 until the washing of the stainless-steel aging cylinders on all of the layers has been completed.

The equipment can be selectively configured with one or more layers of sub-platforms for aging according to actual requirements, each of the layers including two or more sub-platforms for aging. The sub-platforms for aging on the same layer are adjacent and are arranged at the same height. Various configurations can be used in the present disclosure. The following specific example describes the method, taking the specific equipment having three layers each of which includes three sub-platforms for aging as an example.

The method for aging an alcohol product by using intelligent ultrasonic technology realizes that a new alcohol product in a stainless-steel aging cylinder is indirectly aged using ultrasonic technology. The specific aging process includes the following sub-processes.

Figure 3:
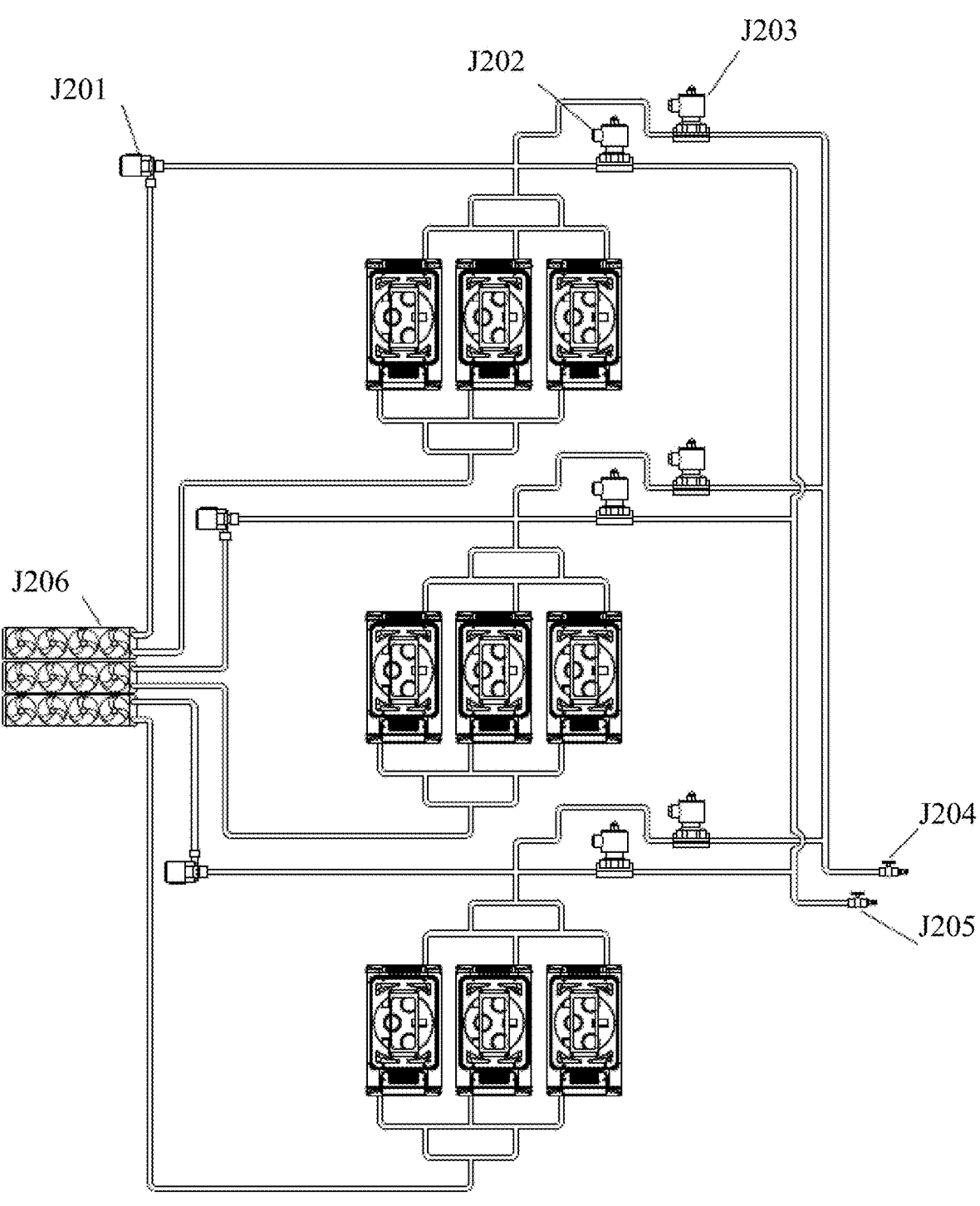
FIG. 3 illustrates a control schematic diagram with a water pipeline.

FIG. 3 was a control schematic diagram with a water pipeline. The water-injecting sub-process, the temperature control sub-process and the water discharge sub-process were all realized by controlling the water pipeline. The sub-platforms for aging were respectively arranged on the three layers of the rack. The cooling water heat exchangers J206 were all arranged on the top layer over which there was an air outlet. The sub-platforms for aging on the same layer are adjacent and are arranged at the same height. The sub-platforms for aging on each of the layers share one of the cooling water heat exchangers J206. A public water discharge pipe and a public water feed pipe are provided in the system. The public water discharge pipe and the public water feed pipe are respectively provided with a manual water discharge main valve J205 and a manual water feed main valve J204. The public water discharge pipe and the public water feed pipe are connected to a water supply system and a water discharge system outside the equipment. The sub-platforms for aging on each of the layers are provided with one public water feed sub-control valve J203 and one public sub-control water discharge valve J202 which are used to control the layer. The water inlets and outlets of three stainless-steel tanks on the sub-platforms for aging on the same layer are respectively connected to one or more layers of horizontal pipes of equilibrium water which is horizontally arranged. The middle part of the horizontal pipes of equilibrium water on the bottom layer is connected to the public water discharge pipe and the public water feed pipe respectively. The sub-platforms for aging on the same layer can be provided with a liquid level sensor on only one of the stainless-steel tanks. By monitoring the water level of one of the stainless-steel tanks, the liquid levels of the other stainless-steel tanks on this layer can be obtained. When it needed to inject water into the stainless-steel tank, the water discharge valves were controlled to close and the water feed sub-control valve J203 on each layer was controlled to open. Since the tap water itself had water pressure, after the water feed sub-control valve J203 was opened, the water pressure of the injected water can realize injection of water into the stainless-steel tank. Due to different pipeline lengths and routes of each of the sub-platforms for aging on the same layer, the water injection speeds of different sub-platforms for aging on the same layer may be different. In order to solve this problem, after the water feed sub-control valve J203 was controlled to open for a period of time, and to close for a period of time. Since the stainless-steel tanks on the same layer are connected to each other, due to the connectivity principle, the water levels of the stainless-steel tanks on the same layer remain consistent after a period of time. The water feed sub-control valve J203 was opened again for water injection and closed for a period of time. The control operation was repeated until the preset water level was reached to complete the injection of water. For water discharge, it is a simpler operation. The public water outlet was arranged at the lowest part of the entire equipment. When water discharging operation needed to be performed, the water discharge valve was controlled to open to discharge the water in the water pipeline and the stainless-steel tank via the public water outlet at the lowest part under action of gravity. For injecting and discharging water, operation in parallel or layer-by-layer operation for a plurality of layers can be flexibly arranged.

In order to realize separate control of temperature of the aging process, the sub-platforms for aging on each of the layers were provided with one cooling water heat exchanger J206 separately. The cooling water heat exchanger J206 was provided with a water inlet and a water outlet. At the bottom of the stainless-steel tank, a circulating water inlet was further provided. The circulating water inlets of the sub-platforms for aging on the same layer were connected to the same horizontal pipe of circulating water which was horizontally arranged. The horizontal pipe of equilibrium water was connected to the water inlet through the water pipe. The horizontal pipe of circulating water was connected to the water inlet through the water pipe. A circulating water pump J201 was arranged between them. A cooling fan was arranged on the cooling water heat exchanger J206. When the temperature of the alcohol product in the stainless-steel aging cylinder J111 was monitored to exceed a preset upper limit threshold, the corresponding circulating water pump J201 to the aging sub-platform on this layer was initiated, and the corresponding cooling fan was initiated to perform the cooling treatment on the water in the stainless-steel tank through the cooling water heat exchanger J206. When the temperature of the water in the stainless-steel tank was monitored to decrease to a preset lower limit threshold, the corresponding circulating water pump J201 to the aging sub-platform on this layer and the corresponding cooling fan were closed.

Figure 4:
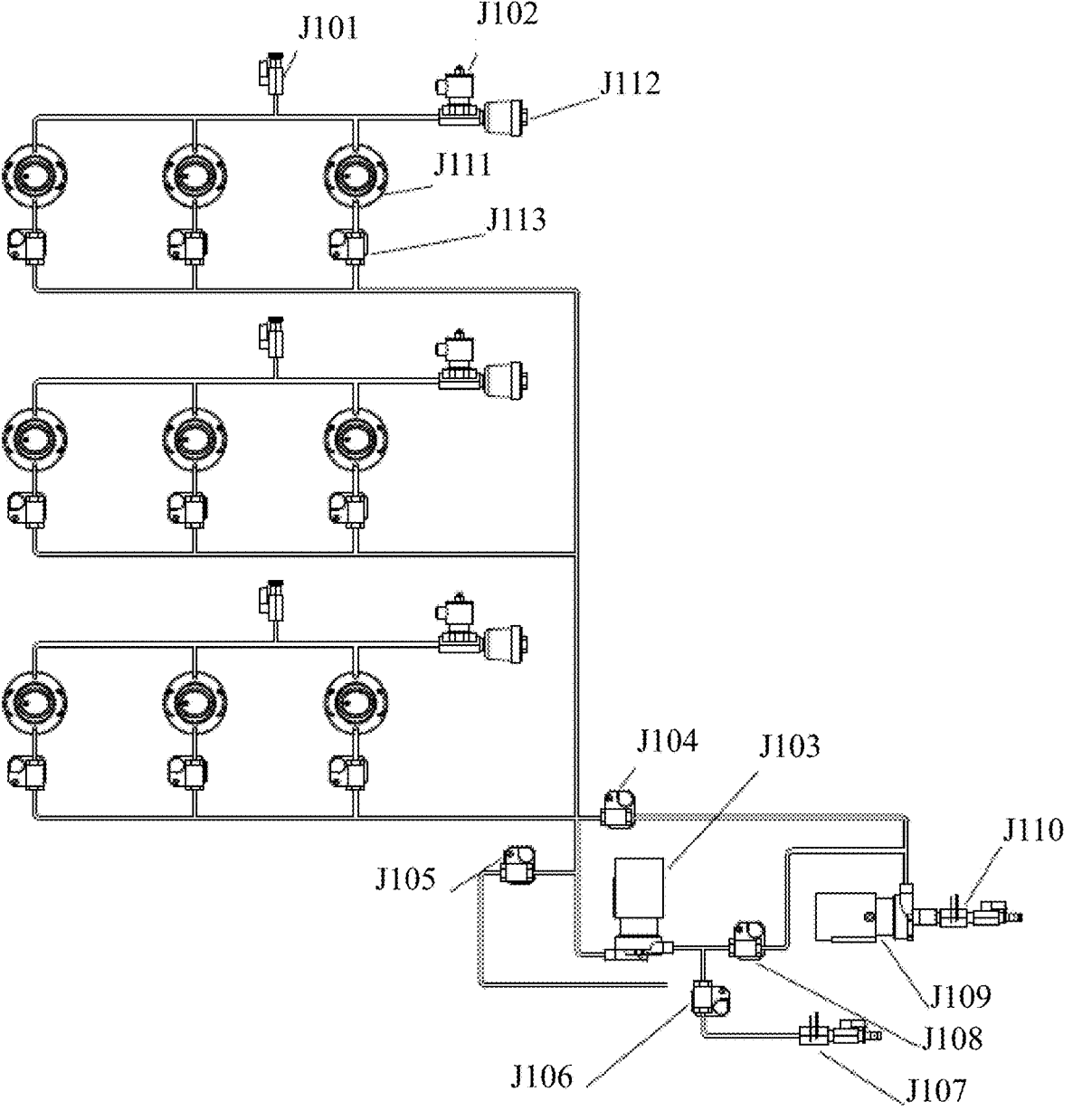
FIG. 4 illustrates a control schematic diagram with an alcohol product pipeline.

FIG. 4 is a control schematic diagram with an alcohol product pipeline. Both the alcohol product-feeding sub-process and the alcohol product-discharging sub-process were realized based on controlling the alcohol product pipeline. The system design breaks conventional design ideas. Generally, it is the most easily envisaged design that one alcohol product-feeding pipe and one alcohol product-discharging pipe were respectively arranged on each of the stainless-steel aging cylinders J111, and the new alcohol product to be aged was input through the alcohol product-feeding pipe and the aged alcohol product was discharged through the alcohol product-discharging pipe. The complexity increased due to one more pipeline, and there needed more control valves for control due to more internal pipes. Since the directly drinkable alcohol product was transported in this pipeline, all pipes on this pipeline were made of food-grade stainless-steel materials that meet food hygiene requirements.

Furthermore, during this aging process, sealing needed to be ensured to ensure that the aging process was performed under a sealed environment, thus it is beneficial to reduce joints as much as possible. Therefore, the equipment of the present disclosure provided the alcohol product-feeding pipes and the alcohol product-discharging pipes hared within the equipment, which were connected to the alcohol product-feeding pipeline and the alcohol product-discharging pipeline at the outlet end respectively. The specific details were as follows.

The alcohol product outlet-inlet pipes of the stainless-steel aging cylinders J111 on the same layer are connected to an alcohol product sub-control valve J113 respectively firstly and connected to a sub-pipe for alcohol product which was arranged horizontally. All of the sub-pipes for alcohol products are connected and then divided into two lines, one line was connected to the alcohol product-feeding valve J104 and connected to an alcohol product-feeding pump J109 and connected to the alcohol product-feeding pipe, and another line was connected to an alcohol product-discharging pump J103, and connected to an alcohol product dis- charge valve J106, and connected to the alcohol product-discharging pipe. Since the alcohol product pipeline system is kept sealed as a whole, ventilation holes must be provided during the feeding and discharging the alcohol product. Otherwise, the alcohol product-feeding and discharging operations cannot be performed normally. An exhaust pipe was further arranged on the top cover of the stainless-steel aging cylinder J111. The exhaust pipes of the stainless-steel aging cylinders J111 on the same layer were connected to the corresponding public exhaust sub-pipes to the layers. One end of the public exhaust sub-pipe was sealed, and another end was provided with an exhaust valve J102 and a filter J112. The purpose of the filter J112 was to prevent from possible existed toxic and harmful ingredients which may enter through the exhaust pipe to affect or contaminate the alcohol product without protection in an environment of equipment operation. This exhaust valve J102 was opened only when the alcohol product was fed and discharged, and closed during the other period. A manual alcohol product-discharging valve J107 was arranged at the inlet of the alcohol product-discharging pipe, and a manual alcohol product-feeding valve J110 was arranged at the inlet of the alcohol product-feeding pipe.

Since the alcohol product-feeding pipe and the alcohol product-discharging pipe are partially shared, for feeding and discharging the alcohol product and the alcohol product, each of the valves was required to be controlled layer by layer. The alcohol product pipeline had no water pressure, since it was generally connected to the alcohol product vat, external force is required. Feeding the alcohol product was controlled to generally perform layer by layer, and discharging the alcohol product was also controlled to generally perform layer by layer. They were performed in parallel for multiple layers. When injecting the new alcohol product, the exhaust valve J102 of the aging sub-platform was controlled to open. All of the alcohol product sub-control valves J113 on this layer were controlled to open and the alcohol product-discharging valves J106 were closed, and the alcohol product-feeding valves J104 were opened. At the same time, the alcohol product-feeding pump J109 was initiated, and feeding the alcohol product into the stainless-steel ageing cylinder J111 was initiated. During the injection process, the liquid level of the alcohol product in each of the stainless-steel ageing cylinders J111 was monitored. When the liquid level reaches a preset threshold, the corresponding alcohol product sub-control valve J113 was controlled to close immediately. After the new alcohol product was injected into all of the stainless-steel aging cylinders J111 on this layer as required, the exhaust valve J102 on this layer was closed. The alcohol product-feeding operations of the other layers are initiated until for all stainless-steel aging cylinders J111, the alcohol product-feeding operations have been completed. The alcohol product-feeding pump J109 and the alcohol product-feeding valve J104 were controlled to close. After the alcohol product-feeding operation has been completed, a process for aging the alcohol product using ultrasonic technology can be initiated. When the alcohol product-aging operation has been completed, the aged alcohol product needed to be discharged into the aged alcohol product vat. Since most of the pipes for feeding the alcohol product and discharging the alcohol product are shared, after the alcohol product-feeding operation has been completed, the new alcohol product actually resides on the alcohol product pipeline. If discharging the alcohol product into an aged alcohol product vat was directly initiated, a large amount of the unaged alcohol product in the pipeline was also inevitably discharged to the aged alcohol product vat, which inevitably affects the quality of the final alcohol product. Therefore, it is necessary to remove the residual new alcohol product. In order to avoid wasting, a bypass pipeline was arranged between the alcohol product-discharging pump J103 and the alcohol product-discharging valve J106 and between the alcohol product-feeding valve J104 and the alcohol product-feeding pump J109. A bypass valve 108 is arranged on the bypass pipeline. When the alcohol product-discharging operation was initiated, the alcohol product-discharging valve J106 is firstly controlled to close. The bypass valve 108 was opened. The alcohol product-discharging pump J103 was initiated. The alcohol product in the alcohol product pipeline system returned to the new alcohol product vat through the bypass pipeline. At the initial stage, the main reflux was the new alcohol product, and after the residual new alcohol product in the pipeline has been discharged and the remains were all the aged alcohol product, the alcohol product-discharging valve was closed, and the alcohol product-discharging valve J106 was opened to discharge the aged alcohol product to the aged alcohol product vat until all of the alcohol product have been discharged. The system can be automatically controlled to execute the entire processes of feeding, aging, and discharging the alcohol product. A waste alcohol product-discharging pipe was arranged on the alcohol product-discharging pipe. The waste alcohol product-discharging pipe, which was connected to the water discharge pipe, was provided with a waste alcohol product-discharging valve J105.

During actual production, there may also be the following requirements. After long-time work, the internal pipes and the stainless-steel aging cylinders needed to be washed. Since the entire system was sealed, it is obviously unrealistic to disassemble and wash each part. This system further provides a high-pressure gas input port. Each of the public exhaust sub-pipes was provided with a high-pressure gas input port J101. The high-pressure gas input port J101 was provided with an electronic control or manual gas valve. The high-pressure gas pump is detachably connected to the high-pressure gas input port J101 through a pipe. The high-pressure gas can be input through the high-pressure gas input port J101 by the external high-pressure gas pump to wash inside of the pipelines. The gas of the selected high-pressure gas pump is a gas that meets food hygiene requirements, and a medical gas pump is generally selected.

The above disclosure is only one type of the examples of the present disclosure, and certainly cannot limit the scope of this right. A person of ordinary skill in the art can understand that all or a part of the processes for implementing the above examples, and equivalent changes according to the claims of the present disclosure still fall within the scope covered by the present disclosure.

The invention claimed is:

1. A method for aging an alcohol product by using intelligent ultrasonic technology, wherein a sealed stainless-steel aging cylinder is arranged in advance on a bracket that is arranged above a stainless-steel tank provided with an ultrasonic generator at a bottom so as to realize indirect aging of a new alcohol product in the stainless-steel aging cylinder by using ultrasonic technology, wherein specific aging processes comprise:

a water-injecting sub-process: injecting water into the stainless-steel tank to a preset liquid level by controlling an electric control valve;

an alcohol product-feeding sub-process: injecting the new alcohol product to be aged into the stainless-steel aging cylinder from a new alcohol product vat to a preset liquid level by controlling an electric control valve for feeding the alcohol product;

an alcohol product-aging sub-process: aging, by controlling an ultrasonic drive circuit, the new alcohol product in the stainless-steel aging cylinder according to a preset aging process;

a temperature control sub-process: continuously monitoring a temperature of water in the stainless-steel tank in a process of aging the new alcohol product, and controlling water in the stainless-steel tank through a cooling equipment within a preset temperature range; and an alcohol product-discharging sub-process: after the aging of the new alcohol product has been completed, discharging an aged alcohol product to an aged alcohol product vat through an electric control valve for discharging the alcohol product, and then re-performing the alcohol product-feeding sub-process to draw the new alcohol product from the new alcohol product vat for performing a new round of aging of a new alcohol product.

2. The method for aging an alcohol product by using intelligent ultrasonic technology according to claim 1, wherein the method further comprises a gas-washing sub-process of injecting a high-pressure gas with a set pressure intensity into an alcohol product pipeline to atomize a residual alcohol product in the alcohol product pipeline by instantaneously releasing and to discharge the atomized residual alcohol product from the alcohol product pipeline with the high-pressure gas.

3. The method for aging an alcohol product by using intelligent ultrasonic technology according to claim 2, wherein the gas-washing sub-process comprises following specific steps:

step 3.1, closing an exhaust valve, a main alcohol product-feeding valve, an alcohol product discharge valve, and an electric control sub-inlet valve;

step 3.2, opening a waste alcohol product-discharging valve between an alcohol product-discharging pipe and a water discharge pipe;

step 3.3, connecting a high-pressure gas pump to a high-pressure gas input port to be washed; injecting the high-pressure gas into the stainless-steel aging cylinder arranged on a same layer through the high-pressure gas pump, and when a pressure of the high-pressure gas in the stainless-steel aging cylinder is detected to reach a preset range, stopping injection of the high-pressure gas and closing a gas intake valve;

step 3.4, opening the electric control sub-inlet valves on the same layer at a same time to vaporize the residual alcohol product in the stainless-steel aging cylinder and the alcohol product pipeline and to discharge the residual alcohol product with the high-pressure gas through the alcohol product pipeline, wherein a part of the alcohol product is liquefied at an outlet due to sharp drop in the pressure intensity and discharged through the water discharge pipe to complete the gas-washing of the stainless-steel aging cylinder on the layer; and step 3.5, closing all of the electric control sub-inlet valves when the gas-washing has been completed, and executing the step 3.3 until the washing of the stainless-steel aging cylinders on all of layers has been completed.

4. The method for aging an alcohol product by using intelligent ultrasonic technology according to claim 2, wherein each of the stainless-steel aging cylinder is provided with only one alcohol product outlet-inlet pipe which extends into a bottom of the stainless-steel aging cylinder and is slightly higher than the bottom of the stainless-steel aging cylinder, wherein feeding the alcohol product and discharging the alcohol product are performed through the alcohol product outlet-inlet pipe; and wherein the alcohol product-feeding sub-process specifically comprises firstly closing the electric control valve for discharging the alcohol product on an alcohol product-discharging pipeline, opening a main alcohol product-feeding valve, controlling to open a corresponding electric control sub-inlet valve to the stainless-steel aging cylinder to be injected and initiating an alcohol product-feeding pump to inject a new alcohol product to be aged into the stainless-steel aging cylinder, and closing the corresponding electric control sub-inlet valve to the stainless-steel aging cylinder when a liquid level of the alcohol product reaches or exceeds a preset range by monitoring the liquid level in the stainless-steel aging cylinder during the process.

5. The method for aging an alcohol product by using intelligent ultrasonic technology according to claim 4, wherein the alcohol product-discharging sub-process specifically comprises closing the main alcohol product-feeding valve, keeping the alcohol product-discharging valve closing, opening the corresponding electric control sub-inlet valve to each of the stainless-steel aging cylinder and at the same time opening a bypass valve on a bypass pipe between the alcohol product-discharging pipe and the alcohol product-feeding pipe, initiating an alcohol product-discharging pump, controlling to re-inject the alcohol product processed within a preset time period back to the new alcohol product vat, when the preset time period is expired, controlling to open the alcohol product-discharging valve and at a same time closing the bypass valve, controlling to discharge the aged alcohol product into an aged alcohol product vat until all of the alcohol products have been discharged, and closing the alcohol product-discharging pump and the alcohol product-discharging valve.

6. The method for aging an alcohol product by using intelligent ultrasonic technology according to claim 5, wherein an exhaust hole is provided on an upper cover of each of the stainless-steel aging cylinder, the exhaust hole being connected to an exhaust pipe provided with an exhaust valve and a filter at an outlet, wherein the exhaust valve is controlled to open when the alcohol product-discharging sub-process is initiated and when the alcohol product-feeding sub-process is initiated, and after the alcohol product-discharging sub-process and the alcohol product-feeding sub-process are performed, the exhaust valve is controlled to close, realizing sealing of the stainless-steel aging cylinder during the aging of the alcohol product.

7. The method for aging an alcohol product by using intelligent ultrasonic technology according to claim 6, wherein the method further comprises a new alcohol product washing sub-process comprising initiating the alcohol product-feeding sub-process firstly; after the alcohol product-feeding sub-process has been performed, opening the exhaust valve, closing the main alcohol product-feeding valve and the alcohol product-discharging valve and at the same time opening the bypass valve on the bypass pipe between the alcohol product-discharging pipe and the alcohol product-feeding pipe; and initiating the alcohol product-discharging pump to discharge the alcohol product in all of the stainless-steel aging cylinders back to the new alcohol product vat through the bypass pipe.

8. The method for aging an alcohol product by using intelligent ultrasonic technology according to claim 1, wherein the method further comprises a temperature control sub-process comprising additionally arranging a water cooler with a water outlet connected to a water inlet of the stainless-steel tank and a water inlet connected to a water outlet of the stainless-steel tank, and a circulating water pump on a pipeline; during the aging sub-process, monitoring a temperature of water in the stainless-steel tank through a temperature sensor, when the temperature is monitored to exceed a preset threshold, initiating the circulating water pump and the water cooler to cool water in the stainless-steel tank through the water cooler to control the temperature within the preset range.

9. The method for aging an alcohol product by using intelligent ultrasonic technology according to claim 1, wherein more than two stainless-steel aging cylinders are arranged at a same height, and each of the stainless-steel aging cylinders is correspondingly provided with a separate ultrasonic drive unit and the stainless-steel tank; water inlets of the stainless-steel tanks on a same layer are connected and connected to a water inlet pipe; water outlets of the stainless-steel tanks on the same layer are connected and connected to a water discharge pipe; the stainless-steel tanks on the same layer are provided with only one liquid level sensor; when an water injection operation is initiated, the water discharge valve is closed and a water inlet switch is controlled to open to inject water into the stainless-steel tank; after a period of injection, the water inlet switch is closed; after a period of delayed waiting, it is determined whether a current height of the liquid level has reached a preset height; if not, the water inlet switch is opened again to inject the water into the stainless-steel tank; after a period of the injection, the water inlet switch is closed again; after a period of delayed waiting, it is determined again whether a current height of the liquid level has reached a preset height; and the operation is repeated until the preset height of the liquid level has been reached.

10. The method for aging an alcohol product by using intelligent ultrasonic technology according to claim 1, wherein the method further comprises a water-replenishing sub-process and a water-replacing sub-process, wherein the water-replenishing sub-process comprises regularly monitoring the liquid level of the stainless-steel tank, when the liquid level of the stainless-steel tank is detected to be below a preset threshold, injecting water into the stainless-steel tank to reach a preset height by controlling a water inlet valve; and wherein the water-replacing sub-process specifically comprises recording a current duration of water use in the stainless-steel tank by arranging a timer or a counter, when the preset duration threshold is reached, performing the water-replacing sub-process after a last alcohol product-discharging sub-process has been completed, closing the water feed valve, opening the water discharge valve, discharging water in the stainless-steel tank and a water pipeline, and re-performing the water-injecting sub-process.

\* \* \* \* \*